April 18, 1967    R. D. ANWYL ET AL    3,314,344
FILTER COMPENSATION MECHANISM
Filed May 11, 1964    2 Sheets-Sheet 1
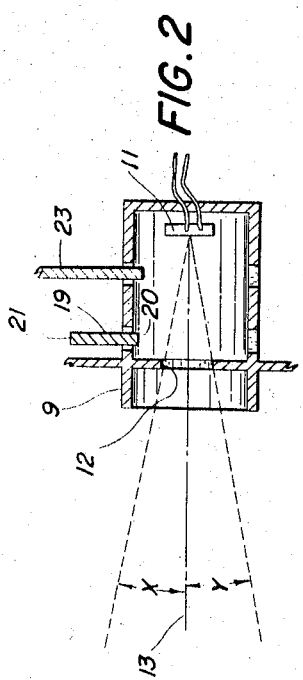
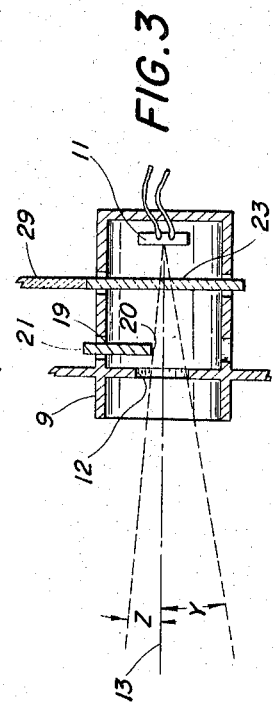
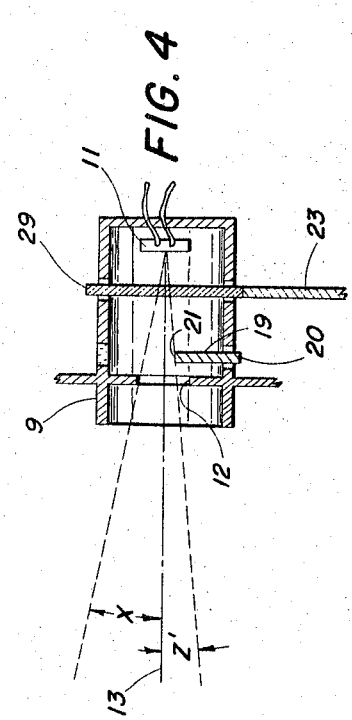
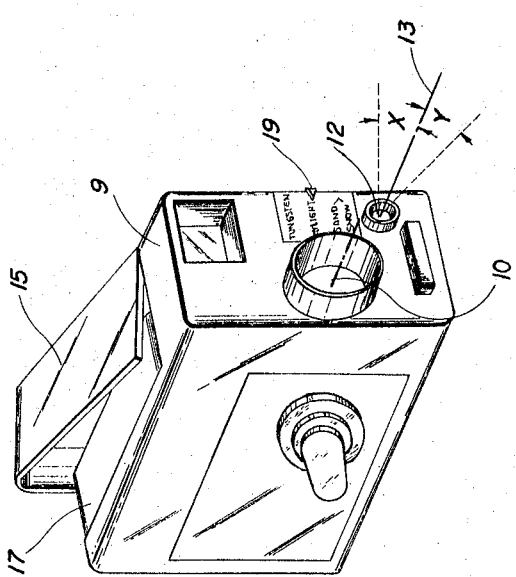
ROBERT D. ANWYL
ALLEN G. STIMSON
INVENTORS
ATTORNEYS

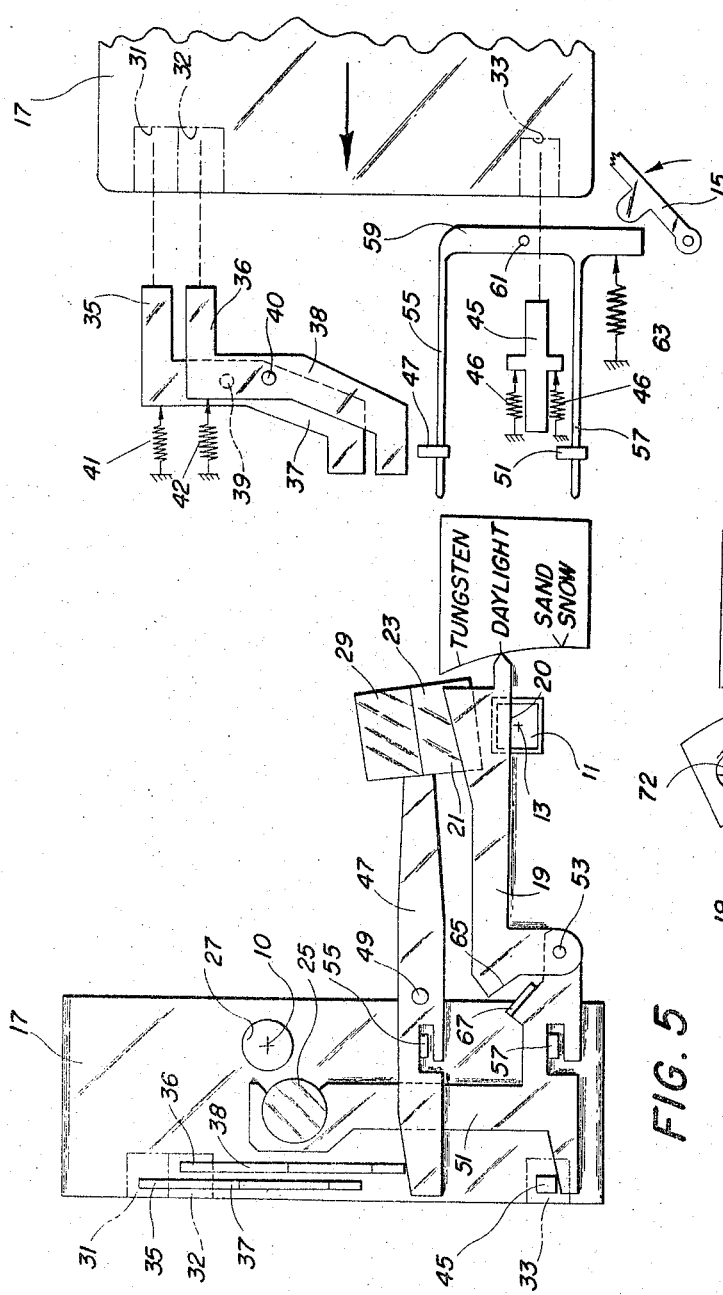

United States Patent Office 3,314,344
Patented Apr. 18, 1967

3,314,344
FILTER COMPENSATION MECHANISM
Robert D. Anwyl and Allen G. Stimson, Rochester, N.Y., assignors to Eastman Kodak Company, Rochester, N.Y., a corporation of New Jersey
Filed May 11, 1964, Ser. No. 366,271
5 Claims. (Cl. 95—10)

This invention relates to cameras having automatic exposure-determining means controlled as a function of scene light as represented by the output of a photoresponsive device and, more particularly, relates to such cameras having filter means for automatically correlating the spectral composition of film-exposing light with the spectral sensitivity of the film being exposed therein.

The subject invention is an improvement on the automatic filter compensating device disclosed in U.S. Patent No. 3,176,599 issued on Apr. 6, 1965, in the name of R. D. Anwyl and owned by the assignee of the subject application. In said Anwyl patent, a system is disclosed which utilizes film sensitivity information encoded on the film magazine for conditioning the camera automatically to correlate the spectral composition of film-exposing light with the spectral sensitivity of the film being exposed and, simultaneously, for adjusting the camera's automatic exposure control system to compensate for the change in the intensity of film-exposing light occasioned by the introduction or removal of a color compensating filter into or out of alignment with the camera's picture-taking axis. In the system disclosed in the said Anwyl patent, the operator merely sets a lighting condition input lever in accordance with the conditions under which exposures are to be made, namely, "sunlight" or "artificial" illumination, and color correction and exposure control compensation are accomplished automatically.

It is well known in the art that excessive skylight or excessive reflected light from a foreground of sand, water or snow will cause overexposure of the cameras photoresponsive device and will cause, therefore, the underexposure of the subject being photographed under such conditions. This problem has been met by prior art cameras in any number of ways, including multiple photocell units, tipping of the photocell so that it faces downward from the camera-lens axis, special baffling of the photocell aperture limiting the upper vertical acceptance angle of the photocell, etc. However, in each of these prior art attempts to compensate for this backlighting problem, a particular automatic system compensated in the manner just referred to leads to exposure errors when the camera is used indoors with artificial illumination. The subject invention obviates this problem by providing a movable photocell mask which is removed completely when film is to be exposed under conditions of artificial illumination, and is selectively positionable to provide needed backlight compensation for either excessive skylight or excessive foreground-reflected light when the film is to be exposed under conditions of daylight illumination.

The subject invention provides a simple mechanism whereby the camera's exposure control system is automatically compensated for the introduction or removal of the color correcting filter and, simultaneously, the automatic exposure control system is compensated for the effects of excessive backlighting (skylight or reflected surface light from sand, water or snow). This is accomplished by means of a simple, manually positioned photocell mask which, when the color compensating filter is introduced into alignment with the camera's picture-taking axis, reduces the illumination of the photocell proportionate to the reduction of film exposing light caused by the filter. This photocell mask is selectively positioned to reduce one of the vertical limits of the acceptance angle of the photocell, thereby limiting the illumination received from either the upper or lower portions of the scene as viewed by the photocell.

It is an object of this invention to provide a new and improved photocell masking mechanism for cameras in which exposure is automatically controlled.

It is another object of this invention to provide a mechanically simple and economical mechanism to compensate a camera's automatic exposure control system in response to the introduction or removal of color correcting filters used to correlate the spectral composition of film-exposing light with the spectral sensitivity of the film being exposed and, simultaneously, to compensate for the effects of excessive backlight when film is to be exposed under conditions of sunlight illumination.

It is another object to provide a simple means for compensating a camera's automatic exposure control system for excessive backlight conditions, said means being selectively positioned to attenuate either excessive skylight or excessive surface reflected light.

Other objects, purposes and characteristics features of the present invention will be in part obvious from the accompanying drawings and in part pointed out as the description of the invention progresses. In describing the invention in detail reference will be made to the accompanying drawings in which like reference characters designate corresponding parts throughout the several views, and in which:

FIG. 1 is a perspective view of a camera according to the invention herein;

FIGS. 2, 3 and 4 are elevation views of the camera's photocell aperture showing film speed compensating neutral density filters in various positions as well as a filter compensating mask positioned, respectively, for artificial illumination, daylight illumination under conditions of excessive skylight, and daylight illumination under conditions of excessive reflected light from sand, water or snow;

FIGS. 5 and 6 are two views of a schematic representation of an automatic filter compensation system according to the invention herein with certain parts being omitted from each view for purposes of clarity; and FIG. 7 illustrates an alternative photocell masking means.

Referring now to FIG. 1, camera 9 has a picture-taking axis 10 on which are aligned, in the manner well known in the art, the camera's lens system, an automatically controlled diaphragm vane, and a shutter (not shown). The camera's automatic exposure control system is adjusted conventionally as a function of the output of photocell 11 (FIG. 2) which is suitably mounted behind aperture 12 for measuring field brightness along optical axis 13, aperture 12 providing a vertical optical acceptance angle for photocell 11 designated by angles X and Y. Hinged cover 15 permits insertion of film magazine 17 into camera 9. A manually positioned lever 19 is accessible to the camera operator and is indexed by detents (not shown) to any one of three positions in accordance with the lighting conditions under which the film is to be exposed; namely, "tungsten" (artificial illumination), "daylight" and "sand or snow."

Referring now to FIGS. 2, 3, and 4, part of lighting input lever 19 is formed into an opaque mask section having a lower edge 20 and an upper edge 21. FIG. 2 shows lighting input lever 19 positioned to accommodate the camera's automatic exposure control system for artificial illumination conditions. In this position, lighting input lever 19 is completely out of alignment with optical axis 13 and photocell 11 receives full scene illumination through the vertical acceptance angle defined by angles X and Y.

It should be noted at this time that, for purposes of this disclosure, it is assumed that camera 9 is designed to receive an exposed film which has a spectral sensitivity balanced either for daylight or for artificial (tungsten) illumination and, further, that such film can have any one of three relative film speeds which shall be designated simply as "low," "moderate" and "high." In the situation illustrated in FIG. 2, it is assumed that "high" speed film is to be exposed, and therefore no neutral density filter is placed between the scene and photocell 11, since the maximum response of photocell 11 is required by the camera's exposure control system to adjust the camera's automatic diaphragm in accordance with scene brightness.

FIG. 3 shows the photocell aperture when camera 9 has been conditioned to expose "moderate" speed film under normal daylight conditions. A neutral density filter 23 has been moved automatically in front of photocell 11 in a manner which will be explained below to compensate the camera's exposure control system for the lower speed of the film being exposed. The operator has moved lighting input lever 19 to the "daylight" position. (See FIGS. 1, 5 and 7.) In this position, input lever 19 releases a color compensating filter 25 which moves into alignment with the camera lens 27 (see FIG. 5 and further explanation below), and the lower edge 20 of the input lever 19 protrudes into the upper portion of the light path exposing photocell 11. The percentage of the light which is blocked by the opaque mask portion of lever 19 is preselected to compensate the camera's automatic exposure control system for the light loss occasioned by the introduction of color compensating filter 25 in front of the camera lens 27. In addition to compensating for this light loss, the opaque mask portion of input lever 19 is also positioned to lower the upper limit of the vertical acceptance angle normally formed by photocell aperture 12. As can be seen in FIG. 3, while the positioning of input lever 19 does not affect the lower limit of the optical vertical acceptance angle as represented by the angle Y, it does alter the upper limit of the normal optical acceptance angle, reducing it from former angle X to the angle represented by the letter Z. This limits the amount of light reaching photocell 11 from the upper portion of the scene and thereby provides the necessary backlight compensation to prevent underexposure of the photographic subject due to excessive relative sky brightness.

In FIG. 4 is is assumed that the camera is loaded with "low" speed film and that heavier neutral density filter 29 has been positioned in front of photocell 11 to compensate the camera's automatic exposure control system for the decreased sensitivity of the lower speed film being exposed. It is further assumed that the camera operator intends to expose film in daylight either on a sandy beach or a snow-covered landscape and, therefore, has set lighting input lever 19 in alignment with the index mark for "sand or snow." This moves the opaque mask portion of input lever 19 to the position illustrated in FIG. 4 with its upper edge 21 extending into the lower portion of the light path exposing photocell 11. Again, the distance the opaque mask portion of lever 19 extends into the light path is predetermined in accordance with the amount of light loss occasioned by the necessary use of color compensating filter 25. In this position, while the upper limit of the optical acceptance angle formed by photocell aperture 12 remains unchanged (as represented by the angle X), lever 19 has altered the lower limit of the acceptance angle, reducing the normal angle Y to the smaller angle Z'. This raising of the lower limit of the optical acceptance angle for photocell 11 serves to compensate the camera's automatic exposure control system to prevent underexposure of the photographic subject due to excessive light reflected from the sand, water or snow.

FIGS. 5 and 6 illustrate two views of a schematic representation of the invention herein as included in an automatic filter compensation system. Film magazine 17 is provided with code notches 31 and 32 which are representative of the speed of the film in the magazine: both notches 31 and 32 being present for "high" speed film, only notch 31 being present for "moderate" speed film, and both notches 31 and 32 being omitted for "low" speed film. A third code notch 33 is provided on film magazine 17 to indicate film type, the notch 33 being present when the film in the magazine is balanced for tungsten illumination (Type A), and being omitted when film in the magazine has a spectral sensitivity balanced for daylight exposure.

When film magazine 17 is inserted into the camera, coded notch areas 31 and 32 cooperate, respectively, with sensing arms 35 and 36 of levers 37 and 38 which are pivoted, respectively, about pins 39 and 40, the levers being biased to the position shown by springs 41 and 42. Similarly, notch area 33 on film magazine 17 cooperates with slide 45 which is normally biased to the position shown by springs 46.

Neutral density filters 23 and 29 are mounted on lever 47 which is pivoted about its axis 49, and color compensating filter 25 is mounted on lever 51 which rotates about pin 53, the latter also serving as a pivot point for lighting input lever 19.

When the camera cover is opened, filter control levers 47 and 51 are returned to the position illustrated in FIGS. 5 and 6 by the resilient spring arms 55 and 57 of filter drive member 59 which moves about axis 61 and is biased to the position shown by spring 63.

The operation of the automatic filter compensation mechanism disclosed in FIGS. 5 and 6 is as follows: When film magazine 17 is initially inserted into the camera, levers 37 and 38 remain in the position shown only if both notches 31 and 32 are present. In the event that notch 32 is omitted, magazine 17 abuts sensing arm 36 of lever 38 to move lever 38 about its pin 40 against the bias of spring 42 in a counterclockwise direction, and if notch 31 is also omitted, film magazine 17 also abuts sensing arm 35 to cause the counterclockwise movement of lever 37 in a similar manner.

Similarly, if film magazine 17 is notched at 33, slide 45 will remain in the position illustrated. However, if notch 33 is omitted, the insertion of magazine 17 into the camera will cause slide 45 to be driven against the bias of springs 46 to a position in blocking relation to lever 51.

It can be seen that levers 37 and 38, in the position illustrated in FIGS. 5 and 6, are in blocking relation to the upward movement of lever 47. However, in the event that notch 32 of film magazine 17 is omitted, lever 38 will be moved out of this blocking relation, and similarly if notch 31 is omitted, lever 37 will also be moved out of blocking relation to the upward movement of lever 47.

When camera cover 15 is closed following the insertion of film magazine 17, it acts on filter drive member 59 to move that member in a clockwise direction about its axis 61 against the bias of springs 63. The clockwise motion of drive member 59 moves resilient spring arms 55 and 57 in an upward direction, and this upward driving force is applied by spring arms 55 and 57, respectively, to levers 47 and 51, tending to cause the latter to move in a clockwise direction about their respective axes 49 and 53.

Lever arm 47 is thus driven in a clockwise direction to one of three positions determined by the abutment of its left end with either lever 37 or 38, or with a stop (not shown). If blocked by lever 38, lever 47 remains in the position shown with neutral density filters 23 and 29 out of alignment with the optical axis 13 of photocell 11 (also see FIG. 2). This occurs, as explained above, when both notches 31 and 32 are present in the surface of film magazine 17, indicating that the film in magazine 17 has a "high" film speed. When the film in magazine 17 has a "moderate" film speed, notch 32 is omitted but notch 31 is present, causing the rotation of only lever 38 and, when camera cover 15 is closed, permitting lever 47 to move upwardly under the driving force of resilient spring arm 55 until it is blocked by lever 37. This further movement of lever 47 positions neutral density filter 23 in alignment with optical axis 13 of photocell 11 (also see FIG. 3). When magazine 17 contains "low" speed film, both notches 31 and 32 are omitted and the closing of camera cover 15 causes lever 47 to position neutral density filter 29 in alignment with optical axis 13 (see FIG. 4), both levers 37 and 38 having been moved out of blocking relation with lever 47 by the insertion of magazine 17.

The upward movement of resilient spring arm 57 tends to drive lever 51 in a clockwise direction. When Type A film is contained in magazine 17 and notch 33 permits slide 45 to remain in the position shown, lever 51 moves clockwise until color compensating filter 25 moves in front of lens 27 in alignment with picture-taking axis 10. However, in the event that Daylight Type film is carried by magazine 17, notch 33 is omitted and the insertion of magazine 17 into camera 9 moves slide 45 to the left into blocking relation with lever 51, preventing the alignment of filter 25 with the camera's picture-taking axis when cover 15 is closed.

Thus, after the initial loading of film magazine 17 into camera 9, when the camera cover 15 is closed the camera is conditioned automatically, in the manner just described above, in accordance with both the speed and spectral sensitivity of the film in magazine 17, and the only remaining step necessary to condition camera 9 for film exposure is the manual setting of lighting input lever 19 in accordance with the lighting conditions under which exposures are to be made.

Whenever exposures are to be made with sunlight illumination, the operator moves lever 19 to either "daylight," in which compensation is made for excessive skylight, or to to "sand or snow," which setting compensates for the effect of excessive foreground reflected light, as explained in detail above. However, in the event that Type A film is loaded into the camera and color correcting filter 25 is aligned with picture-taking axis 10, when the operator moves lever 19 to the "tungsten" position to condition the camera for exposure of the film under artificial illumination, a heel 65 of lever 19 cooperates with an ear 67 on lever 51 to pivot lever 51 in a counterclockwise direction about pin 53, thereby moving filter 25 out of alignment with the picture-taking axis. Thereafter, should the operator move lighting input lever 19 to one of the daylight positions, resilient spring arm 57 again moves lever 51 clockwise until color compensating filter 25 is once again aligned with lens 27.

FIG. 7 shows an alternative embodiment for the photocell masking portion of lever 19 in which the exposure of photocell 11 is selectively controlled by one of three Waterhouse stops 70, 71, or 72. Stop 70 is equivalent to a fully opened aperture for photocell 11, while stop 71 reduces the exposure of photocell 11 to compensate for the light loss occasioned by the alignment of color correcting filter 25 in front of lens 27 and, at the same time, provides a correction for the effect of excessive skylight. Stop 72 has an area similar to stop 71 but is designed to alter the lower limit of the optical acceptance angle of photocell 11 to compensate for the effect of excessive foreground-reflected light.

In order to avoid unnecessarily complicating the description of the invention, it has been assumed that any Daylight Type film being used would have a "daylight" film speed somewhat lower than the "daylight" speed of the corresponding (as to speed class) Type A film so that proper exposure would be obtained when filter 25 is not aligned with picture-taking axis 10 and lighting input lever 19 is in one of its daylight positions partially masking photocell 11.

The invention herein has been illustrated and described in a manner selected to facilitate the disclosure of the invention, and various modifications, adaptations, and variations may be made to adapt the invention herein to the requirements of practice without departing from the spirit or scope of the invention as defined in the following claims.

What is claimed is:

1. In a camera having exposure-determining means controlled as a function of the output of a photoresponsive device positioned to be exposed to scene light received through an aperture having an acceptance angle of predetermined upper and lower vertical limits, and a filter selectively positionable in alignment with the picture-taking axis of said camera to alter the spectral composition and reduce the intensity of light passing along said axis, the improvement comprising: masking means positioned between said aperture and said photoresponsive device and being simultaneously movable into blocking relation to said aperture when said filter is aligned with said axis, said masking means altering only one of said vertical limits to reduce the exposure and output of said photoresponsive device as a function of said reduction in intensity of light passing along said axis.

2. The construction according to claim 1 wherein the movement of said masking means into blocking relation to said aperture alters only said upper vertical limit.

3. The construction according to claim 1 wherein the movement of said masking means into blocking relation to said aperture selectively alters either one of said vertical limits.

4. In a camera and film carrying means removably received in said camera, said camera having (a) a picture-taking axis along which film-exposing light is received, (b) exposure-determining means controlled as a function of the output of a photoresponsive device positioned to be exposed to scene light received through an aperture having an acceptance angle of predetermined upper and lower limits, (c) a filter element movable into alignment with said axis for altering the spectral composition and reducing the intensity of light exposing said film and (d) lighting condition input means positionable in accordance with the spectral characteristics of scene illumination; and said film carrying means having structural means of a preselected conformation representative of the spectral sensitivity of film carried thereby; the improvement comprising: filter control means cooperating with and responsive to said structural means on said film carrying means and to the position of said lighting condition input means for moving said filter element into and out of alignment with said axis to correlate the spectral composition of light exposing said film with the spectral sensitivity characteristics of said film; and masking means movable into blocking relation to said aperture and responsive to the position of said lighting condition input means for altering only one of said vertical limits and for reducing the exposure and output of said photoresponsive device in accordance with said reduction of intensity of film-exposing light when said filter element is aligned with said picture-taking axis.

5. The combination according to claim 4 wherein said masking means is selectively movable into a blocking relation to said aperture to alter either one of said vertical limits of said acceptance angle.

References Cited by the Examiner

UNITED STATES PATENTS

| 2,080,055 | 5/1937 | Martin | 95—10 X |
| 2,186,613 | 1/1940 | Mihalyi | 95—10 X |
| 3,073,223 | 1/1963 | Stimson | 95—10 |
| 3,121,170 | 2/1964 | Norwood | 250—229 |

NORTON ANSHER, *Primary Examiner.*

J. F. PETERS, *Assistant Examiner.*